(12) United States Patent
Zhang et al.

(10) Patent No.: US 12,702,246 B2
(45) Date of Patent: Aug. 11, 2026

(54) SYSTEMS AND METHODS FOR MAKING BLENDED DRINKS

(71) Applicant: ZENBLEN, INC., Chicago, IL (US)

(72) Inventors: Xinyuan Zhang, Chicago, IL (US); Constantine Bovalis, Chicago, IL (US); Daniel Bernacki, Addison, IL (US); Rehman Merali, Toronto (CA)

(73) Assignee: ZENBLEN, INC., Chicago, IL (US)

( * ) Notice: Subject to any disclaimer, the term of this patent is extended or adjusted under 35 U.S.C. 154(b) by 865 days.

(21) Appl. No.: 17/535,431

(22) Filed: Nov. 24, 2021

(65) Prior Publication Data

US 2022/0160162 A1 May 26, 2022

Related U.S. Application Data

(60) Provisional application No. 63/117,656, filed on Nov. 24, 2020.

(51) Int. Cl.

| | |
|---|---|
| ***A47J 31/44*** | (2006.01) |
| ***A47J 31/40*** | (2006.01) |
| ***A47J 43/044*** | (2006.01) |
| ***A47J 43/07*** | (2006.01) |
| *A23G 9/12* | (2006.01) |
| *A23G 9/22* | (2006.01) |
| *A23G 9/28* | (2006.01) |

(52) U.S. Cl.
CPC ........... *A47J 31/4403* (2013.01); *A47J 31/40* (2013.01); *A47J 43/044* (2013.01); *A47J 43/0711* (2013.01); *A23G 9/12* (2013.01); *A23G 9/224* (2013.01); *A23G 9/28* (2013.01)

(58) Field of Classification Search
CPC ....... A47J 31/4403; A47J 31/40; B01F 33/84; B01F 33/844; B01F 33/8442
See application file for complete search history.

(56) References Cited

U.S. PATENT DOCUMENTS

| | | | | |
|---|---|---|---|---|
| 2,654,505 A * | 10/1953 | Fuhrman | A47J 31/402 | 222/2 |
| 7,144,150 B2 * | 12/2006 | Farrell | B01F 35/145 | 134/115 R |
| 7,520,662 B2 * | 4/2009 | Farrell | A47J 43/0705 | 134/115 R |
| 2010/0133222 A1 * | 6/2010 | Mathieu | A47J 31/40 | 141/2 |
| 2010/0151083 A1 * | 6/2010 | Klier | B67D 1/0034 | 426/66 |
| 2011/0090756 A1 * | 4/2011 | Farrell | B08B 9/00 | 366/138 |

(Continued)

*Primary Examiner* — Marc C Howell
(74) *Attorney, Agent, or Firm* — Cook Alex Ltd.

(57) ABSTRACT

Systems and methods for making blended drinks are disclosed. In some embodiments, the system is a blended drink kiosk that can include an exterior housing includes multiple segregated sections with independent thermal control. In some embodiments, the blended drink kiosk includes one or more pumps to dispense liquid ingredients in a metered fashion, a solid dispensing mechanism; a paste dispensing mechanism; a powder dispensing mechanism; and/or a blending apparatus. In some embodiments, cups are prefilled with ingredients and are transported manually or by the cup transfer apparatus to a blending apparatus. In some embodiments, the blended drink kiosk is self-cleaning.

18 Claims, 6 Drawing Sheets

(56) References Cited

U.S. PATENT DOCUMENTS

| | | | | |
|---|---|---|---|---|
| 2015/0088304 | A1* | 3/2015 | Ameye | A23L 33/135 700/233 |
| 2017/0347828 | A1* | 12/2017 | Shtivelman | A47J 31/401 |
| 2018/0072555 | A1* | 3/2018 | Fortunato | G06Q 20/3274 |
| 2018/0325306 | A1* | 11/2018 | Mathure | A47J 31/4485 |
| 2018/0332997 | A1* | 11/2018 | Kang | A47J 31/525 |
| 2019/0339006 | A1* | 11/2019 | Cronin | A23L 2/52 |
| 2019/0387768 | A1* | 12/2019 | Ezagui | A23G 9/12 |

* cited by examiner

SYSTEMS AND METHODS FOR MAKING BLENDED DRINKS

CROSS REFERENCE TO RELATED APPLICATIONS

This application is related to and claims priority benefits from U.S. Provisional Patent Application Ser. No. 63/117,656 having a filing date of Nov. 24, 2020, entitled "Blended Drink Kiosks". The '656 application is hereby incorporated by reference herein in its entirety.

FIELD OF THE INVENTION

The present invention relates to systems and methods, including machines, used to create drinks that can be blended, such as smoothies. In some embodiments, the invention relates to robotic kiosks that make blended drinks. In some embodiments, these kiosks work quickly and/or with a high degree of autonomy. In some embodiments, the machine and/or individual components of the machine can be manually operated.

Modern consumers are busier and more health conscious than ever. Many of these consumers desire smoothies (blended beverages typically made of fruits, vegetables, liquid ingredients such as almond milk, juices, and/or additional ingredients such as, but not limited to, peanut butter and protein powder). However, many consumers cite difficulties with the current methods of obtaining a smoothie. For example, making a smoothie at home requires one to purchase several ingredients, including many that must be kept fresh and have a short shelf life. In addition, one needs to obtain and constantly clean a blending device which can be both costly and time consuming.

Alternatively, consumers can purchase smoothies at an establishment such as a smoothie bar. However, in many areas there is not enough demand for smoothies to justify the costs of running a smoothie bar. In addition, a smoothie bar requires a human to actively keep the bar open and blend the smoothies, thus limiting the period consumers can purchase smoothies.

While bottled smoothies exist, many of these pre-packaged options contain high amounts of added sugar as well as preservatives to increase shelf life. Furthermore, many health-conscious consumers perceive the quality of pre-packaged alternatives to be lower than freshly made smoothies. In addition, these pre-packaged options do not allow consumers to customize the beverage with various add-ins, which is commonly done at smoothie bars or when people blend their own smoothies.

What is needed are devices and methods to provide consumers with freshly blended, customizable smoothies. Such devices would eliminate the hassle of traditional homemade smoothies and be cost effective enough to install in areas where the demand for fresh smoothies exists but may not be enough to support a dedicated smoothie bar. In some embodiments, these devices could be used in a variety of settings, including but not limited to, home and/or commercial kitchens, food processing facilities, food trucks, and/or kiosks.

SUMMARY OF THE INVENTION

Systems and methods for making blended drinks are disclosed. In some embodiments, the system is a blended drink kiosk. In some embodiments, a blended drink kiosk can include an exterior housing, one or more pumps to dispense liquid ingredients in a metered fashion, a solid dispensing mechanism, a paste dispensing mechanism, a powder dispensing mechanism, an actuating blending apparatus, a motion system to transport and transfer a cup within and around the machine, a user interface system enabling local and remote ordering and payment, a cup dispensing system, a splash shield, a cup refilling apparatus; and/or a cleaning system.

In some embodiments, a blended drink kiosk can include multiple segregated sections with independent thermal control.

In some embodiments, a blended drink kiosk can include a temperature controlled storage compartment with a first solid ingredient.

In some embodiments, a blended drink kiosk can include a temperature controlled storage compartment with a cup that is pre-filled with a first solid ingredient.

In some embodiments, a blended drink kiosk is configured to work with an application, wherein said application runs on a device. In some embodiments, the application is a third-party delivery application. In some embodiments, the application includes an operator dashboard that automatically plans a servicing schedule and/or an inventory schedule based on feedback from the blended drink kiosk.

In some embodiments, the application allows a user to modify a blended drink after said blended drink kiosk has already begun production of said blended drink.

DETAILED DESCRIPTION OF ILLUSTRATIVE EMBODIMENT(S)

The systems and methods for making blended drinks disclosed can be used in various settings, including but not limited to, home and/or commercial kitchens, food processing facilities, food trucks, and/or kiosks. For illustrative purposes, various embodiments of kiosks will be discussed. However, these systems and methods can be used, unless logic requires otherwise, in various other settings.

Figure 1:
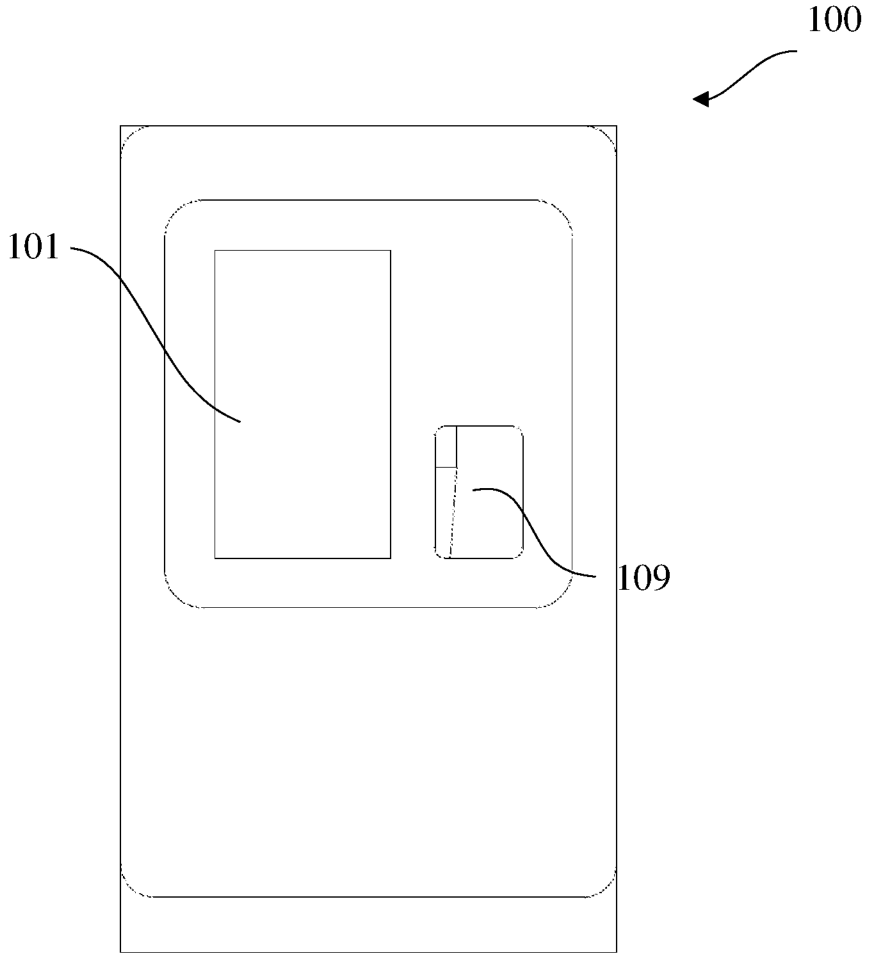
FIG. 1 is a front view of a blended drink kiosk.
Figure 2:
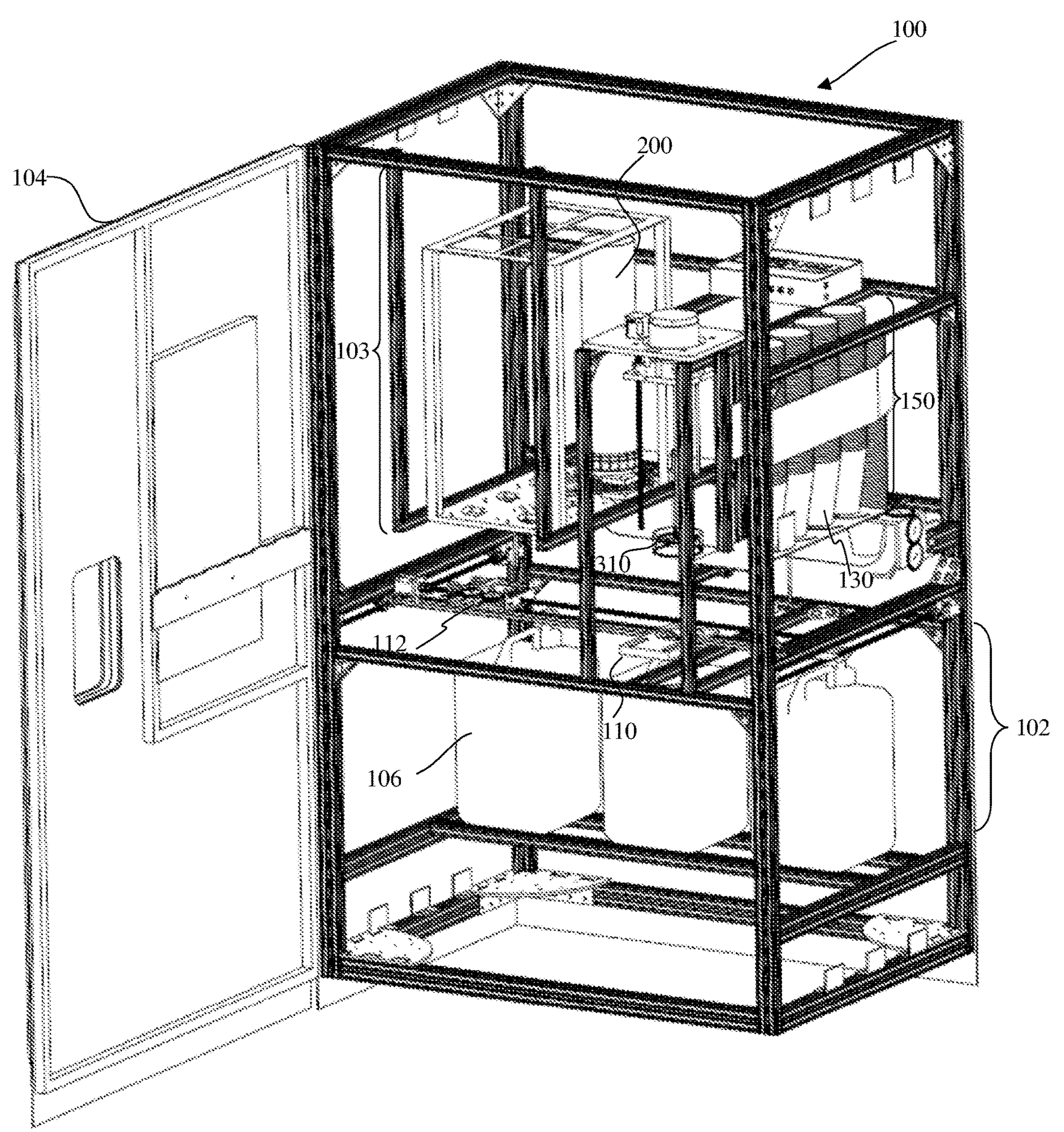
FIG. 2 is a cutaway perspective view of the front of a blended drink kiosk with its exterior door in an open position.
Figure 3:
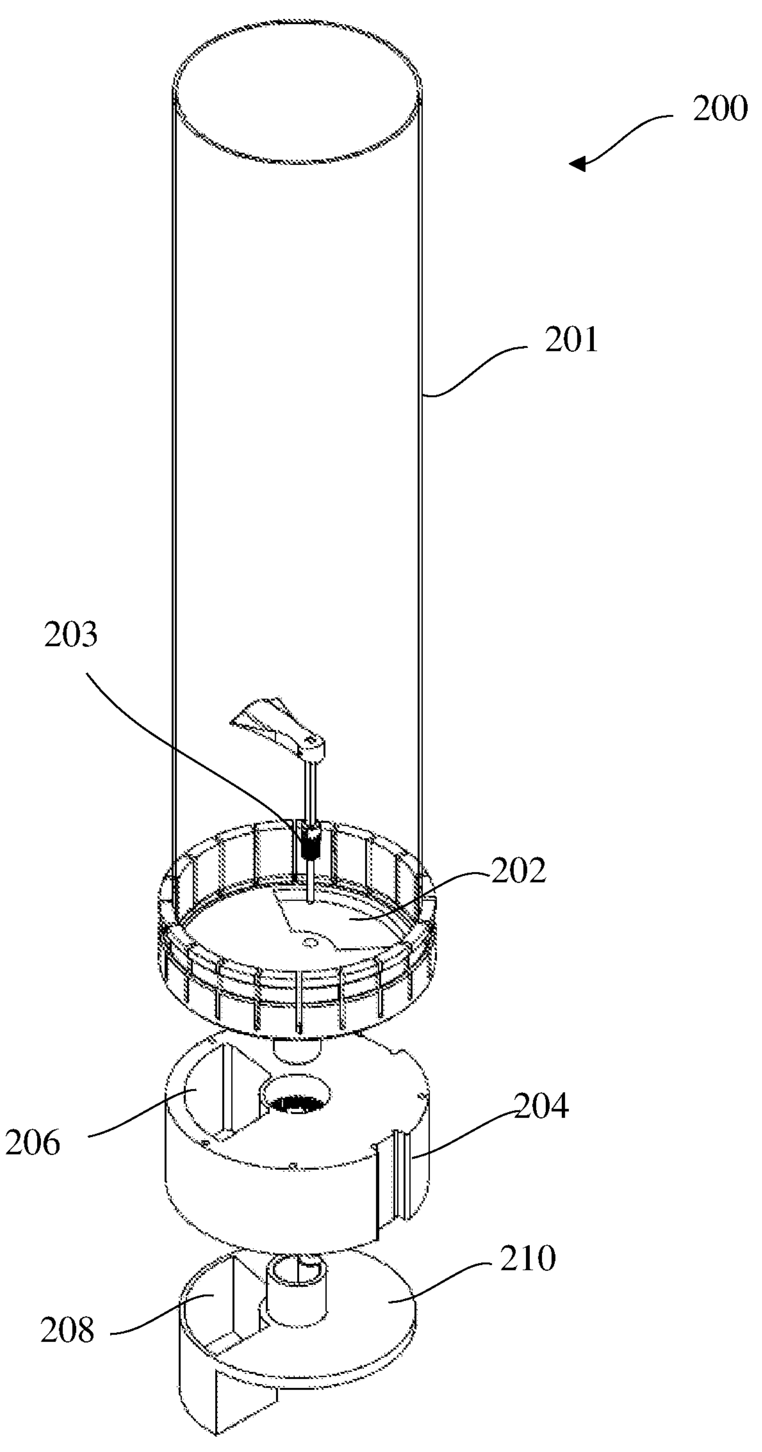
FIG. 3 is an exploded perspective view of a solid dispensing mechanism.
Figure 4:
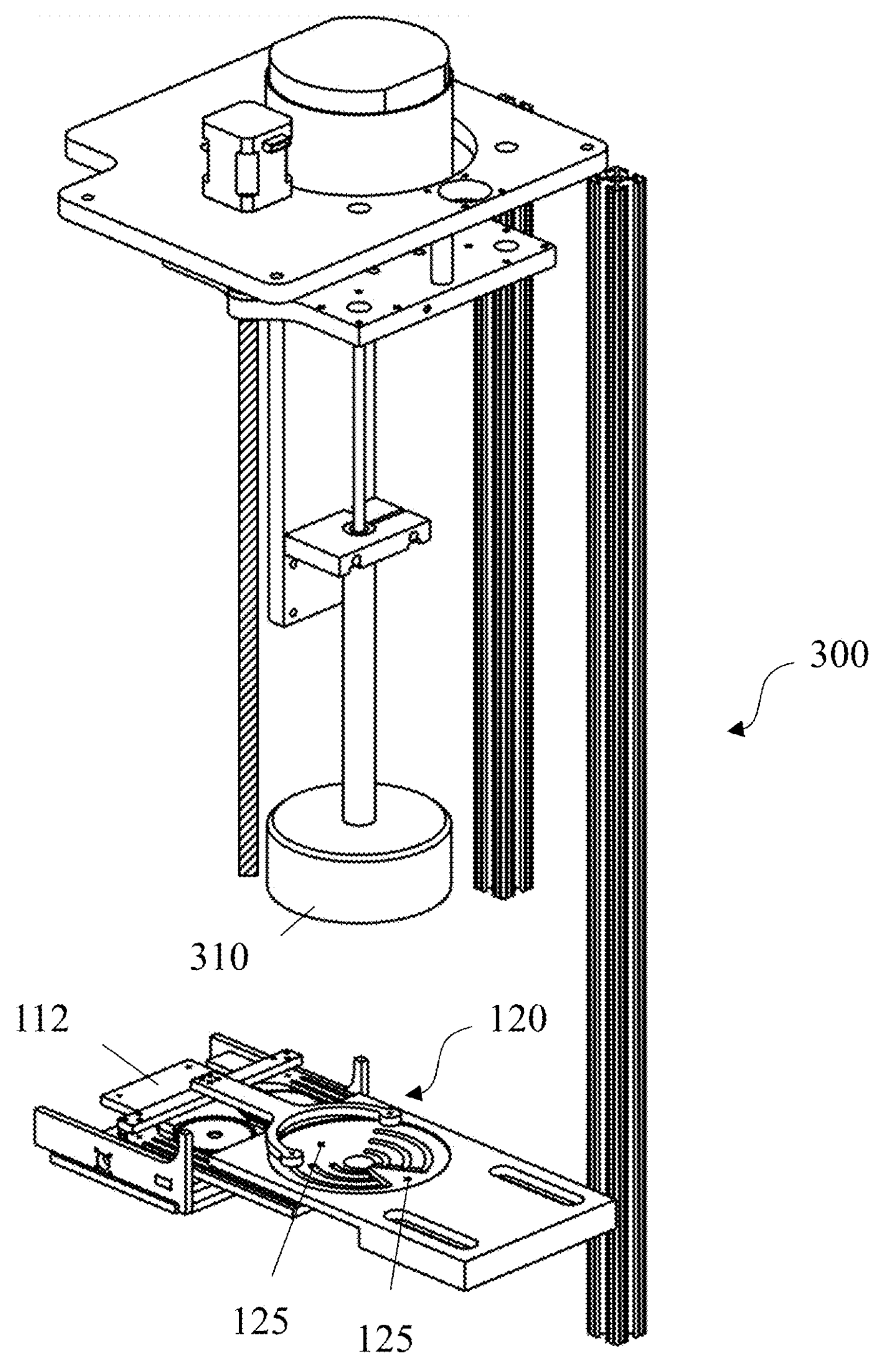
FIG. 4 is an enlarged perspective view of a blending area.

Turning to FIG. 1 and FIG. 2, blended drink kiosk 100 is illustrated. In some embodiments, the exterior casing of blended drink kiosk 100 is made of a sheet metal box or metal chassis to which exterior paneling can be added. In some embodiments, the exterior casing is made of steel sheet metal. In some embodiments, exterior door 104 opens to reveal the interior of blended drink kiosk 100.

In at least some embodiments, blended drink kiosk 100 includes first compartment 102 to house liquid ingredients. In some embodiments, the liquid ingredients are housed in liquid containers 106. In some embodiments, first compartment 102 is temperature controlled. In some embodiments, first compartment 102 is refrigerated. In some embodiments, first compartment 102 is heated. In some embodiments, first compartment 102 is humidity controlled. In some embodiments, first compartment 102 has at least one tube that can pump at least one liquid into cup 130 when cup 130 is located on cup transfer apparatus 112.

In some embodiments, the liquid ingredients include, but are not limited to, water, carbonated water, fruit juice, plant milks (such as almond milk), animal milks, or yogurt.

In at least some embodiments, blended drink kiosk 100 includes second compartment 103. In some embodiments, second compartment 103 is temperature controlled. In some embodiments, second compartment 103 is refrigerated. In some embodiments, second compartment 103 is heated. In some embodiments, second compartment 103 is humidity controlled.

In at least some embodiments, second compartment 103 includes an internal cage. In some embodiments, the cage is movable. In some embodiments, the cage can hold solid dispensing mechanism 200. In some embodiments, the cage can hold a plurality of solid dispensing mechanisms 200. In some embodiments, solid dispensing mechanism 200 is readily removable and/or replaceable.

In some embodiments, solid dispensing mechanism 200 includes container 201 that can hold solid ingredients used in the blended drink. In some embodiments, solid dispensing mechanism 200 includes container 201 with agitating agent 203 to push the solid ingredients through cutout 202 when cutout 202 aligns with compartment 206 of rotatable plate 204. In some embodiments, rotatable plate 204 then rotates to align compartment 206 with chute 208 of bottom plate 210 such that the solid ingredients fall into cup 130.

In some embodiments, solid dispensing mechanism 200 can contain a solid crushing mechanism to crush solid ingredients. In some embodiments, the geometry of the solid crushing mechanism can be adjustment to accommodate different solid ingredients. In some embodiments, solid dispensing mechanism 200 can contain a chamber that stores crushed ingredients.

In some embodiments, agitating agent 203 can rotate to mitigate bridging and clumping of solid ingredients. In some embodiments, this is done via a gearing system within rotatable plate 204. In some embodiments, agitating agent 203 may be oriented at various angles. In some embodiments, agitating agent 203 can extend the length of container 201.

In some embodiments, second compartment 103 can have a plurality solid dispensing mechanisms 200 with varying volumetric sizes of containers 201. In some embodiments, containers 201 can be variously shaped. In some embodiments, the shape and/or volume of the container 201 is based on the type of ingredient being stored in the container. For example, certain types of ingredients may crush better in a particular shaped container. Similarly, certain ingredients may be more popular or have a longer shelf life, and it can be desirable to use larger sized containers 201 for these type of ingredients and a smaller sized container 201 for a less popular ingredient and/or and ingredient with shorter shelf life.

In some embodiments, the geometry of agitating agent 203 can be adjusted to accommodate different solid ingredients.

In some embodiments, solid dispensing mechanism 200 can utilize a paddle wheel to dispense solid ingredients.

In some embodiments, second compartment 103 has an opening where solid ingredients can be dispensed from second compartment 103 into cup 130. In some embodiments, the opening is at the bottom of second compartment 103.

In some embodiments, the solid ingredients can include, but are not limited to, fruits, vegetables, and/or frozen liquids such as ice.

In some embodiments, second compartment 103 may be opened for refilling solid dispensing mechanism(s) 200 with solid ingredients. In some embodiments, compartment 103 has a removable top.

In some embodiments, second compartment 103 is configured such that when opened, the door of second compartment 103 and/or an internal chassis can be pulled out either by, but not limited to, a counter weight or a spring assistance.

In at least some embodiments, the door of second compartment 103 can be positioned to allow for solid dispensing mechanism(s) 200 to be easily loaded and unloaded from second compartment 103. In some embodiments, the door of second compartment 103 tilts down.

In at least some embodiments, first compartment 102 and/or second compartment 103 are connected to a cooling system. In some embodiments, the cooling system can include a compressor, solid state modules, a fluid refrigerant, at least one condenser coil, at least one evaporator coil, a temperature monitoring system, and/or a capillary tube.

In some embodiments, the cooling system regulates the temperature(s) of first compartment 102 and/or second compartment 103. In some embodiments, the cooling system is connected to first compartment 102 and/or second compartment 103 by at least one baffle.

In at least some embodiments, first compartment 102 and/or second compartment 103 can have individual doors to conserve energy when the exterior door 104 of blended drink kiosk 100 is opened.

In some embodiments, blended drink kiosk 100 includes a paste dispensing mechanism and/or a powder dispensing mechanism configured to dispense paste and/or powder into cup 130. In some embodiments, a single dispensing mechanism can dispense both paste and powder.

In some embodiments, the paste ingredients include, but are not limited to, nut butters (such as peanut butter), honey, and jellies. In some embodiments, the powder ingredients include, but are not limited to, whey powder, nutritional powders, protein powder, sugars, and other sweeteners.

In some embodiments, cup transfer apparatus 112 is configured to move in the X, Y and/or Z directions. In some embodiments, cup transfer apparatus 112 is configured to move in the X and Y directions.

In some embodiments, cup transfer apparatus 112 is on an X-Y table.

In some embodiments, cup transfer apparatus 112 is configured to position itself under various ingredient dispensing devices such as solid dispensing mechanism(s) 200, liquid dispensing mechanism(s), paste dispensing mechanism(s) and/or a powder dispensing mechanism(s). In some embodiments, solid dispensing mechanism(s) 200, liquid dispensing mechanism(s), paste dispensing mechanism(s) and/or a powder dispensing mechanism(s) can move to position themselves above cup transfer apparatus 112.

In some embodiments, blended drink kiosk 100 can be loaded with cups that are pre-filled with solid ingredients. In some embodiments, cups pre-filled with solid ingredients can be stored in second compartment 103. In some embodiments, cups pre-filled with solid ingredients can be transferred to cup transfer apparatus 112.

In some embodiments, blended drink kiosk 100 includes a motion system, such as an X-Y table. In some embodiments the X-Y table can also move in the Z axis. In some embodiments, the motion system is controlled via a computer system. In some embodiments, the motion system includes motors to move internal apparatuses, such as but not limited to, a cup transportation/transfer system and blending apparatus 310 used to blend the ingredients together.

In some embodiments, the motion system includes belts, pulleys, gears, linear rails and/or lead screws.

In some embodiments, the motion system includes sensors, such as load sensors, infrared sensors, cameras, proximity sensors, curtain light sensors, encoders, and/or limit switches. In some embodiments, these sensors are used to aid in homing and determining the position of the transfer apparatus 112. In some embodiments, these sensors give closed loop feedback control abilities.

In some embodiments, the transfer apparatus 112 moves under cup dispensary apparatus 150. In some embodiments, when the transfer apparatus 112 is underneath cup dispensary apparatus 150, cup dispensary apparatus 150 dispenses cup 130 into a cup holder. In some embodiments, a load sensor on transfer apparatus 112 senses cup 130. In some embodiments, the load sensor measures the amount of solid and liquid ingredients dispensed into cup 130. In some embodiments, this creates a closed feedback loop system.

In some embodiments, if cup dispensary apparatus 150 is activated and the load sensor does not sense a cup, an operator is notified to refill cup dispensary apparatus 150. In some embodiments, if cup dispensary apparatus 150 is activated and the load sensor does not sense a cup, transfer apparatus 112 moves to another cup dispensary apparatus 150.

In some embodiments, if cup dispensary apparatus 150 is activated and the load sensor does not sense a cup, an apparatus to refill cup dispensary apparatus 150 is activated. In some embodiments, this apparatus is activated electronically. In some embodiments, this apparatus is activated by an additional motor within the motion system. In some embodiments, this apparatus is powered by motion from the cup transportation/transfer apparatus.

In some embodiments, particularly embodiments intended for home use, blended drink kiosk 100 can be configured to accept pre-filled and/or empty cups and cup dispensary apparatus 150 is not present. In some embodiments, these cups are reusable.

In some embodiments, once transfer apparatus 112 has cup 130, it can move to locations within blended drink kiosk 100 where it receives some, if not all, of the ingredients prior to blending. In some embodiments, once the ingredients are in cup 130, cup transfer apparatus 112 can, by way of a mechanical system, transfer cup 130 to blending area 300 underneath blending apparatus 310 where, in some embodiments, additional ingredients can be dispensed into cup 130.

In at least some embodiments, blending area 300 can, through the motion system, deploy a splash shield that can seal cup 130. In some embodiments, this keeps the ingredients within cup 130 during blending. In at least some embodiments, blending area 300 can, through the motion system, lower the blades that blend the ingredients inside cup 130.

In some embodiments, blending apparatus 310 can be equipped with a current sensor to measure the current it draws. In some embodiments, this information can be used to actively control the motion of blending apparatus 310, moving it up and down, to provide the consumer with a customizable degree of blend. In some embodiments, the customizable degree of blend allows blending apparatus 310 to spend more time in a portion of cup 130 that has not reached a desired blend consistency. In some embodiments, an encoder can be used to track the position of blending apparatus 310.

In some embodiments, blended drink kiosk 100 is at least partially self-cleaning. In some embodiments, blended drink kiosk 100 includes a cleaning system 120. In at least some embodiments, the cleaning system macroscopically and/or microscopically cleans various parts of blended drink kiosk 100 including the area 109 where cup 130 transference occurs, food contact surfaces, and/or where blending occurs.

In some embodiments, the cleaning system 120 utilizes nozzles 125 to deliver pressurized liquid to the desired area(s). In some embodiments, the liquid can be stored internal or sourced externally. The liquid can be, but is not limited to, water stored in blended drink kiosk 100, ozonated water (disinfectant) created by water stored within blended drink kiosk 100, water that is hard piped into blended drink kiosk 100, ozonated water (disinfectant) created by water piped into blended drink kiosk 100, and/or a sanitation liquid (disinfectant) stored within blended drink kiosk 100. In some embodiments, cleaning system may use heated liquids and/or steam.

In some embodiments, the liquid dispensing tubes can be automatically cleaned.

In some embodiments, the cleaning system is activated after each blended drink is created.

In some embodiments of the cleaning system, blending apparatus 310 and/or a splash shield 410 creates a sealed volume. In some embodiments of the cleaning system, blending apparatus 310 and/or a splash shield is lowered to a stationary blending plate. In some embodiments, water and/or another liquid is sprayed from nozzles within the blending area 300 onto all food surfaces. In some embodiments, this is done while blending apparatus 310 is running. In at least some embodiments, once a predetermined amount of liquid has been used and/or a specific period of time has passed, blending apparatus 310 returns to a home position ready to make another blended drink.

In some embodiments, blending apparatus 400 is able to linearly actuate the blender independently.

In some embodiments, splash shield 410 can prevent food particles from escaping the area encompassed by splash shield 410. In some embodiments, splash shield 410 is optically clear. In some embodiments, splash shield 410 is cleaned after each blend. In some embodiments, splash shield 410 is coated with a hydrophobic medium.

Figure 5:
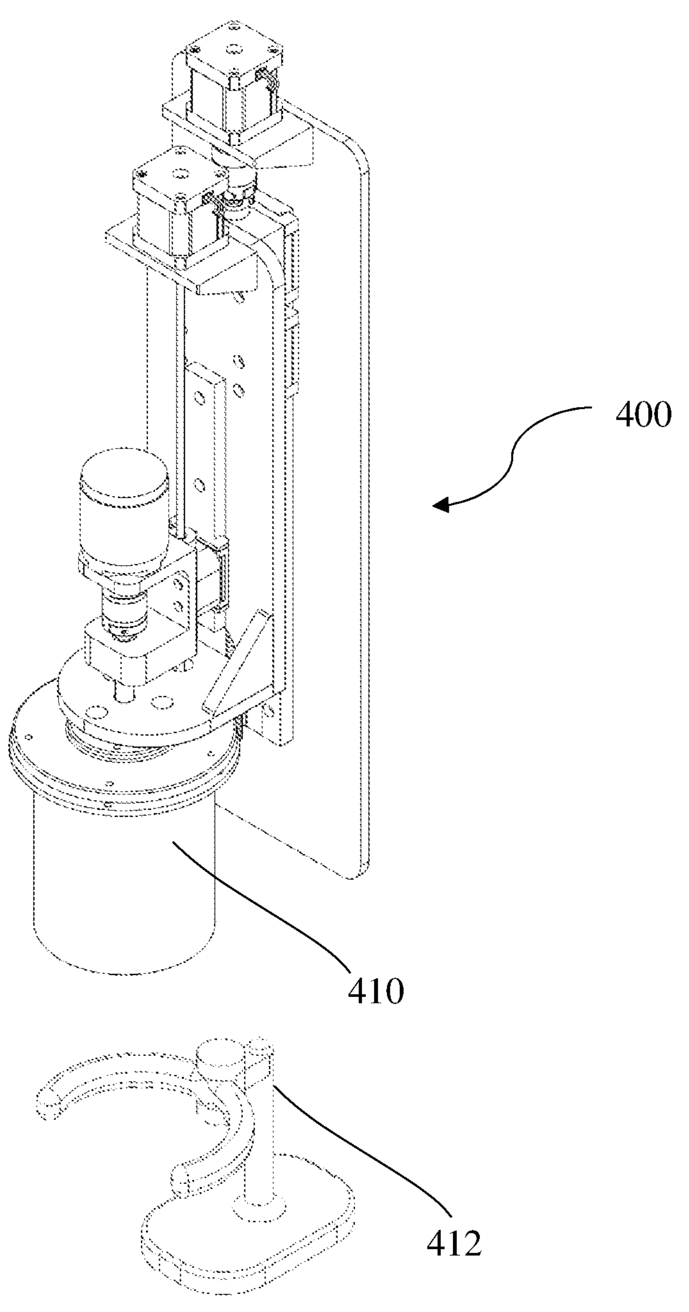
FIG. 5 is an enlarged perspective view of another embodiment of a blending area.
Figure 6:
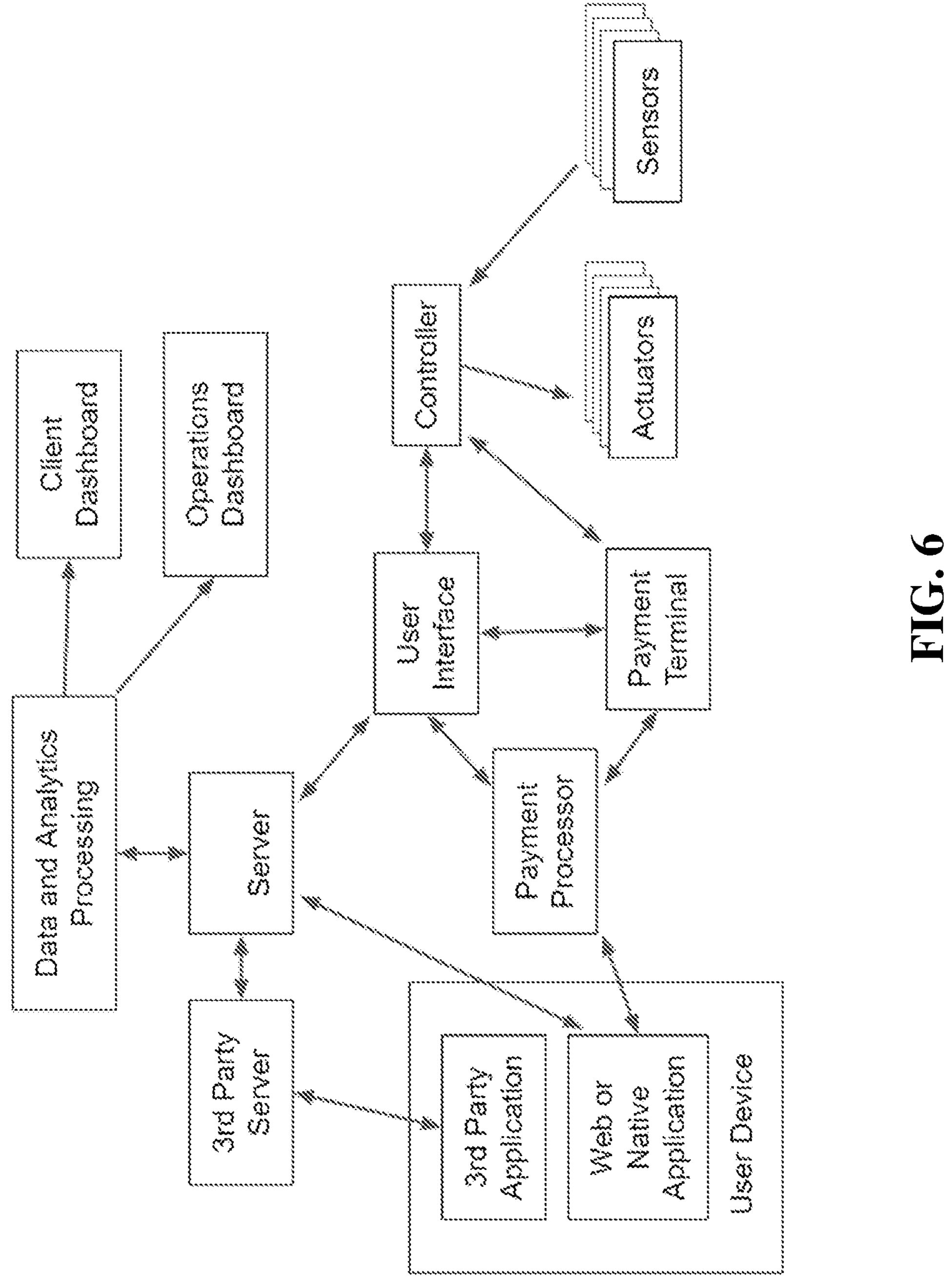
FIG. 6 is a schematic of various networked applications interacting with a blended drink kiosk.

FIG. 5 shows another embodiment of a cup transfer apparatus. Cup transfer apparatus 412 is similar to cup transfer apparatus 112 and what was disclosed about cup transfer apparatus 112 applies to cup transfer apparatus 412. In some embodiments, cup transfer apparatus 412 can open to grip a cup, such as shown in FIG. 5. In some embodiments, cup transfer apparatus 412 can translate vertically to grab a cup.

In at least some embodiments, particulates from the blending process are collected by either a filter and/or in a container of waste liquid. In some embodiments, the waste liquid is drained externally from the machine. In at least some embodiments, the waste liquid piped out of the machine.

In embodiments where the water, disinfectant, and/or waste liquids are stored within blended drink kiosk 100 they can be periodically restocked and/or cleaned out.

In some embodiments, the user is able to visually see the blending process, cleaning process, liquid dispensing process, cup transportation, and/or solid dispensing process.

In some embodiments, such as the one shown in FIG. 1, blended drink kiosk 100 includes a touchscreen 101 for ordering and/or receiving payment. In some embodiments, blended drink kiosk 100 is connected to a network. In some embodiments, blended drink kiosk 100 is configured to receive orders and/or payment via a network. In some embodiments, blended drink kiosk 100 can receive an order from a user and determine the proper time to begin preparing the order using user input and/or location data, such as that obtained by a Global Positioning System, originating from a device associated with said user.

In some embodiments, blended drink kiosk 100 is configured to receive orders and/or payment via Near-Field-Communication, Bluetooth, credit card readers, barcodes and/or QR code scanners.

In some embodiments, blended drink kiosk 100 allows for contactless ordering.

In some embodiments, blended drink kiosk 100 includes aesthetic lighting. In some embodiments, the lighting can be configured to activate when various steps of the blending process are being conducted. In certain embodiments, the lighting can act as a visual indicator for how much longer before a smoothie is ready, the type of smoothie being made, and/or the customer whose smoothie is being prepared.

In some embodiments, blended drink kiosk 100 can alert a user when certain ingredients and/or cups are running low and/or have run out. In some embodiments, blended drink kiosk 100 can direct a user to another blended drink kiosk 100 which has the desired ingredients. In some embodiments this is shown on touchscreen 101. In some embodiments, this alert is sent via an electronic message to a third party located at a remote location. In some embodiments, blended drink kiosk 100 is part of a network.

In some embodiments, blended drink kiosk 100 is directly connected to a network. In some embodiments, blended drink kiosk 100 can transmit signals via one of several wireless communications protocols, such as Bluetooth, Wi-Fi, CDMA (Code Division Multiple Access), 900 MHz, 3G/4G/5G/Cellular, near-field communication, and/or other communication protocols to a network.

In some embodiments, blended drink kiosk 100 can accept orders via an application. In some embodiments the application can be located on user interface running directly on blended drink kiosk 100, such as touchscreen 101. In some embodiments, blended drink kiosk 100 can accept orders from an application running on an external device. In some embodiments, the external device is one of a smartphone, a tablet, laptop, smartwatch, or personal computer, such as a single-board computer. In some embodiments, the application is a web-based application. In some embodiments, blended drink kiosk 100 can receive orders from a third-party application, such as a third-party food-delivery application, a third-party order ahead application, or a third-party pickup order application.

In some embodiments, the application can be a mobile-based, cloud-based, server-based and/or an online-based application. In some embodiments, the application can be hosted by a commercially available platform. In some embodiments, the application can be embodied in a non-transitory computer-readable storage medium.

In at least some embodiments, order information goes to a server and/or to a user interface which can be located on touchscreen 101. In at least some embodiments, if an order was initiated from anywhere other than a user interface running directly on blended drink kiosk 100, such as touchscreen 101, the order can be retrieved at a user interface running directly on blended drink kiosk 100, such as touchscreen 101 from a server. In some embodiments, the order information is obtained at a user interface running directly on blended drink kiosk 100, such as touchscreen 101, by various methods including, but not limited to, entering a pin, phone number, scanning a QR code (quick response code) and/or tapping an NFC (near-field communication) device. In some embodiments, the order information is obtained at a user interface running directly on blended drink kiosk 100, such as touchscreen 101, automatically through the use of wireless signals (such as using a MAC address) and/or video recognition. In some embodiments, blended drink kiosk 100 is configured such that an order may be picked up by the end user and/or delivery person. In some embodiments, a user is able to send a pickup code, such as but not limited to, a pin, phone number, scanning a QR code to a delivery person. In some embodiments, the application automatically sends this pickup code to a third-party delivery person.

In at least some embodiments, payment can be taken on the networked computer and/or at the user interface. In at least some embodiments, payment is based on a per drink basis. In at least some embodiments, a user can subscribe to a membership that enables free or discounted smoothies. In some embodiments, a user's membership can be determined by various methods, including but not limited to, entering a pin, phone number, scanning a QR code and/or tapping an NFC device. In some embodiments, a user's membership information is automatically obtained at a user interface running directly on blended drink kiosk 100, such as touchscreen 101, through the use of wireless signals (such as using a MAC address) and/or video recognition.

In at least some embodiments, a user interface sends an order to the controller on the machine that creates the order by sending signals to actuators such as but not limited to, pumps, motors, lights, and the like, and receiving feedback from sensors, such as but not limited to, touch sensors, light sensors, weight sensors, and the like. In at least some embodiments, the controller is a program logic controller or a microcontroller. In at least some embodiments, order and/or sensor information can be passed back to a server.

In some embodiments if the user specifies the thickness of their smoothie, the machine can vary the speed, duration, and plunge depth of the blender to achieve the desired thickness.

In at least some embodiments, a full order can be sent to the controller at once. In at least some embodiments, the order can be sent to the controller in phases. For example, in at least some embodiments, if the cup size is sent first, the machine can first get the appropriate cup while waiting for additional information. Similarly, if the solid ingredients are sent, the machine can begin to prepare those while waiting for additional information. Similarly, if the liquid ingredients are sent, the machine can begin to prepare those while waiting for additional information. Similarly, in some embodiments if the user specifies the thickness of their smoothie, the machine can vary the speed, duration, and plunge depth of the blender to achieve the desired thickness.

In some embodiments, a user can order and pay for a type of smoothie While the smoothie is being prepared, an application and/or the touchscreen can offer additional options, such as adding protein or adjusting the smoothie thickness. In at least some embodiments, the blended drink kiosk has the ability to add/adjust the order while it is already being prepared.

In some embodiments, a server collects information on orders placed. In some embodiments, this information includes user information. In some embodiments, the server also collects information about the blended drink kiosk via a controller and/or user interface. In some embodiments, this information is processed by a data and analytics engine. In some embodiments, this data is sent to a user device and/or a user interface, such as touchscreen 101, to provide personalized recommendations to the user based on their order history and/or based on what others have ordered with similar orders.

In some embodiments, data is sent to a client dashboard where users, such as a kiosk operator, can view the analytics of their machine(s) in aggregate or individually. In some embodiments, the dashboard allows kiosk operators to parse their data to gain further insight on usage and demographic data. In some embodiments, this data is sent to an operations dashboard where operators can view the status of each machine that they are responsible for. For example, in some embodiments this information includes order information, inventory levels, warnings or errors from the machines, service requirements, service instructions, and the like. In some embodiments, the dashboard can provide the operator with what inventory and parts are required to restock machines on the route and suggest a route. In some embodiments, this information is automatically communicated to a kiosk operators before, during and/or after the service is performed.

While particular elements, embodiments and applications of the present invention have been shown and described, it can be understood that the invention is not limited thereto since modifications can be made by those skilled in the art without departing from the scope of the present disclosure, particularly in light of the foregoing teachings.

What is claimed:

1. A blended drink kiosk comprising:
- a first pump to dispense a liquid ingredient in a metered fashion;
- a blending apparatus;
- a cleaning system;
- a temperature controlled storage compartment with a cup that is pre-filled with a solid ingredient, wherein said solid ingredient is a fruit or a vegetable;
- a cup transfer apparatus configured to retrieve said cup that is pre-filled with said solid ingredient from said temperature controlled storage compartment, transport said cup to a location within said blended drink kiosk where said cup receives said liquid ingredient, wherein said blending apparatus is configured to blend said liquid ingredient and said solid ingredient in said cup to create a blended drink; and
- an exterior housing,
- wherein said blended drink kiosk is configured to transmit a signal containing data,
- wherein said cup is configured to serve said blended drink;
- wherein said liquid ingredient is stored in a liquid container, wherein said liquid container is located in a second temperature controlled storage compartment, wherein said temperature controlled storage compartment and said second temperature controlled storage compartment are segregated sections with independent thermal control.

2. The blended drink kiosk of claim 1 further comprising: a user interface system enabling local and remote, ordering and payment.

3. The blended drink kiosk of claim 1 further comprising: a cup dispensary apparatus.

4. The blended drink kiosk of claim 1 wherein said liquid ingredient is a juice.

5. The blended drink kiosk of claim 1 further comprising: a second pump to dispense a second liquid ingredient.

6. The blended drink kiosk of claim 1 further comprising: a splash shield, wherein said splash shield is coated with a hydrophobic medium.

7. The blended drink kiosk of claim 6, wherein said splash shield is lowered to said cup to create a sealed volume.

8. The blended drink kiosk of claim 1 wherein said blended drink kiosk is configured to work with an application, wherein said application runs on a device.

9. The blended drink kiosk of claim 8 wherein said application is a third-party delivery application.

10. The blended drink kiosk of claim 8 wherein said application includes an operator dashboard that automatically plans a servicing schedule and/or an inventory schedule based on said signal.

11. The blended drink kiosk of claim 8 wherein said device is a smartphone.

12. The blended drink kiosk of claim 8, wherein said application allows a user to modify a blended drink after said blended drink kiosk has already begun production of said blended drink.

13. A system for making blended drinks comprising:
- a liquid ingredient;
  - a solid ingredient, wherein said solid ingredient is a fruit or a vegetable; and
  - a blended drink kiosk comprising:
    - a temperature controlled storage compartment with a cup that is pre-filled with said solid ingredient;
    - a first pump to dispense said liquid ingredient in a metered fashion into said cup;
  - a blending apparatus;
    - a cleaning system;
    - a cup transfer apparatus configured to transport said cup from said temperature controlled storage compartment to said blending apparatus;
    - an exterior housing; and
    - a splash shield,wherein said liquid ingredient is stored in a liquid container, wherein said liquid container is located in a second temperature controlled storage compartment, wherein said temperature controlled storage compartment and said second temperature controlled storage compartment are segregated sections with independent thermal control.

14. The system of claim 13 wherein said liquid ingredient is almond milk.

15. The system of claim 13 further comprising:
- an application running on a device,
- wherein said blended drink kiosk is configured to transmit a signal to said application.

16. The system of claim 15 wherein said signal includes data wherein said data is used to provide a personalized recommendation for a user.

17. A method of making a blend drink using a blended drink kiosk wherein said blended drink kiosk comprises:
- a first pump;
- a blending apparatus;
- a cleaning system;
- a temperature controlled storage compartment; and
- a cup transfer apparatus;

the method comprising:
- filling said temperature controlled storage compartment with a plurality of cups pre-filled with a solid ingredient, wherein said solid ingredient is a fruit or a vegetable;

transporting one of said plurality of cups from said temperature controlled storage compartment to said blending apparatus using said cup transfer apparatus;

dispensing a liquid ingredient into said one of said plurality of cups in a metered fashion via said first pump;

blending said solid ingredient with said liquid ingredient in said cup using said blending apparatus to create a blended drink; and delivering said blended drink to an individual in said cup.

18. The method of claim 17 wherein said method further comprises:

lowering a splash shield over said one of said plurality of cups to create a sealed volume.

* * * * *